(12) United States Patent
McCarty et al.

(10) Patent No.: US 12,346,359 B2
(45) Date of Patent: Jul. 1, 2025

(54) DATA INTEGRITY VALIDATION USING DIVERSIFIED QUERIES ACROSS MULTIPLE SOURCES, INTERFACES, AND NETWORKS

(71) Applicant: Accenture Global Solutions Limited, Dublin (IE)

(72) Inventors: Benjamin Glen McCarty, Washington, DC (US); Changwei Liu, Fairfax, VA (US)

(73) Assignee: Accenture Global Solutions Limited, Dublin (IE)

( * ) Notice: Subject to any disclaimer, the term of this patent is extended or adjusted under 35 U.S.C. 154(b) by 165 days.

(21) Appl. No.: 18/053,553

(22) Filed: Nov. 8, 2022

(65) Prior Publication Data
US 2024/0152502 A1    May 9, 2024

(51) Int. Cl.
*G06F 16/3349* (2025.01)
*G06F 16/335* (2019.01)

(52) U.S. Cl.
CPC ........ *G06F 16/3349* (2019.01); *G06F 16/335* (2019.01)

(58) Field of Classification Search
None
See application file for complete search history.

(56) References Cited

U.S. PATENT DOCUMENTS

| | | | |
|---|---|---|---|
| 2008/0310427 A1* | 12/2008 | West | H04L 9/3215 370/400 |
| 2010/0125545 A1* | 5/2010 | Navas | G06F 16/2255 707/E17.069 |
| 2015/0295939 A1* | 10/2015 | Rissanen | H04L 63/10 726/1 |
| 2015/0363603 A1* | 12/2015 | Hsu | H04L 63/18 707/783 |
| 2021/0312065 A1* | 10/2021 | Yang | G06F 21/6218 |
| 2023/0291554 A1* | 9/2023 | Nagao | H04L 9/3247 |

OTHER PUBLICATIONS

Ning Wang, et al., "A cross-layer approach to message authentication based on sparse representation for wireless body area networks," International Journal of Distributed Sensor Networks, vol. 13, No. 3 (2017), pp. 1-9.

(Continued)

*Primary Examiner* — Scott A. Waldron
(74) *Attorney, Agent, or Firm* — Polsinelli PC

(57) ABSTRACT

In some implementations, a user device may transmit, to a first data source, a first message encoding a first query and may receive a first response to the first query from the first data source. The user device may transmit, to a second data source, a second message encoding a second query that duplicates the first query and may receive a second response to the second query from the second data source. The user device may transmit a first reverse query to the first data source based on the second response and/or a second reverse query to the second data source based on the first response. The user device may receive at least one reverse query response. Accordingly, the user device may determine whether an answer to the first query is valid, based on the first response, the second response, and the at least one reverse query response.

17 Claims, 12 Drawing Sheets

(56) References Cited

OTHER PUBLICATIONS

Subir Halder, et al., "Cross Layer-Based Intrusion Detection Techniques in Wireless Networks," Chapter 15 in The State of the Art in Intrusion Prevention and Detection (2014), pp. 361-389.

Xiaofei Cui, "Cross-validation based man-in-the-middle attach protection," Masters Thesis, University of Bedfordshire (2017), 85 pages.

Yaoqi Yang, et al., "Man-in-the-Middle Attack Detection and Localization Based on Cross-Layer Location Consistency," IEEE Access, vol. 8 (2020), pp. 103860-103874.

* cited by examiner

DATA INTEGRITY VALIDATION USING DIVERSIFIED QUERIES ACROSS MULTIPLE SOURCES, INTERFACES, AND NETWORKS

BACKGROUND

Query lookups are common. For example, computers may query a search engine in order to convert search terms to uniform resource locators. In another example, computers may query a domain name service in order to convert domain names to Internet protocol addresses.

SUMMARY

Some implementations described herein relate to a method. The method may include generating, at a user device, a first message encoding a first query. The method may include transmitting, to a first data source, the first message. The method may include receiving, at the user device, a first response to the first query from the first data source. The method may include generating, at the user device, a second message encoding a second query, wherein the second query duplicates the first query. The method may include transmitting, to a second data source, the second message. The method may include receiving, at the user device, a second response to the second query from the second data source. The method may include transmitting at least one of a first reverse query to the first data source based on the second response or a second reverse query to the second data source based on the first response. The method may include receiving at least one reverse query response. The method may include determining whether an answer to the first query is valid, based on the first response, the second response, and the at least one reverse query response.

Some implementations described herein relate to a device. The device may include one or more memories and one or more processors communicatively coupled to the one or more memories. The one or more processors may be configured to generate a first message encoding a first query. The one or more processors may be configured to transmit, to a first data source, the first message. The one or more processors may be configured to receive a first response to the first query from the first data source. The one or more processors may be configured to generate a second message encoding a second query, wherein the second query duplicates the first query. The one or more processors may be configured to transmit, to a second data source, the second message. The one or more processors may be configured to receive a second response to the second query from the second data source. The one or more processors may be configured to transmit at least one of a first reverse query to the first data source based on the second response or a second reverse query to the second data source based on the first response. The one or more processors may be configured to receive at least one reverse query response. The one or more processors may be configured to determine whether an answer to the first query is valid, based on the first response, the second response, and the at least one reverse query response.

Some implementations described herein relate to a non-transitory computer-readable medium that stores a set of instructions for a device. The set of instructions, when executed by one or more processors of the device, may cause the device to generate, at the device, a first message encoding a first query. The set of instructions, when executed by one or more processors of the device, may cause the device to transmit, to a first data source, the first message. The set of instructions, when executed by one or more processors of the device, may cause the device to receive, at the device, a first response to the first query from the first data source. The set of instructions, when executed by one or more processors of the device, may cause the device to generate, at the device, a second message encoding a second query, wherein the second query duplicates the first query. The set of instructions, when executed by one or more processors of the device, may cause the device to transmit, to a second data source, the second message. The set of instructions, when executed by one or more processors of the device, may cause the device to receive, at the device, a second response to the second query from the second data source. The set of instructions, when executed by one or more processors of the device, may cause the device to transmit at least one of a first reverse query to the first data source based on the second response or a second reverse query to the second data source based on the first response. The set of instructions, when executed by one or more processors of the device, may cause the device to receive at least one reverse query response. The set of instructions, when executed by one or more processors of the device, may cause the device to determine whether an answer to the first query is valid, based on the first response, the second response, and the at least one reverse query response.

DETAILED DESCRIPTION

Figure 1A:
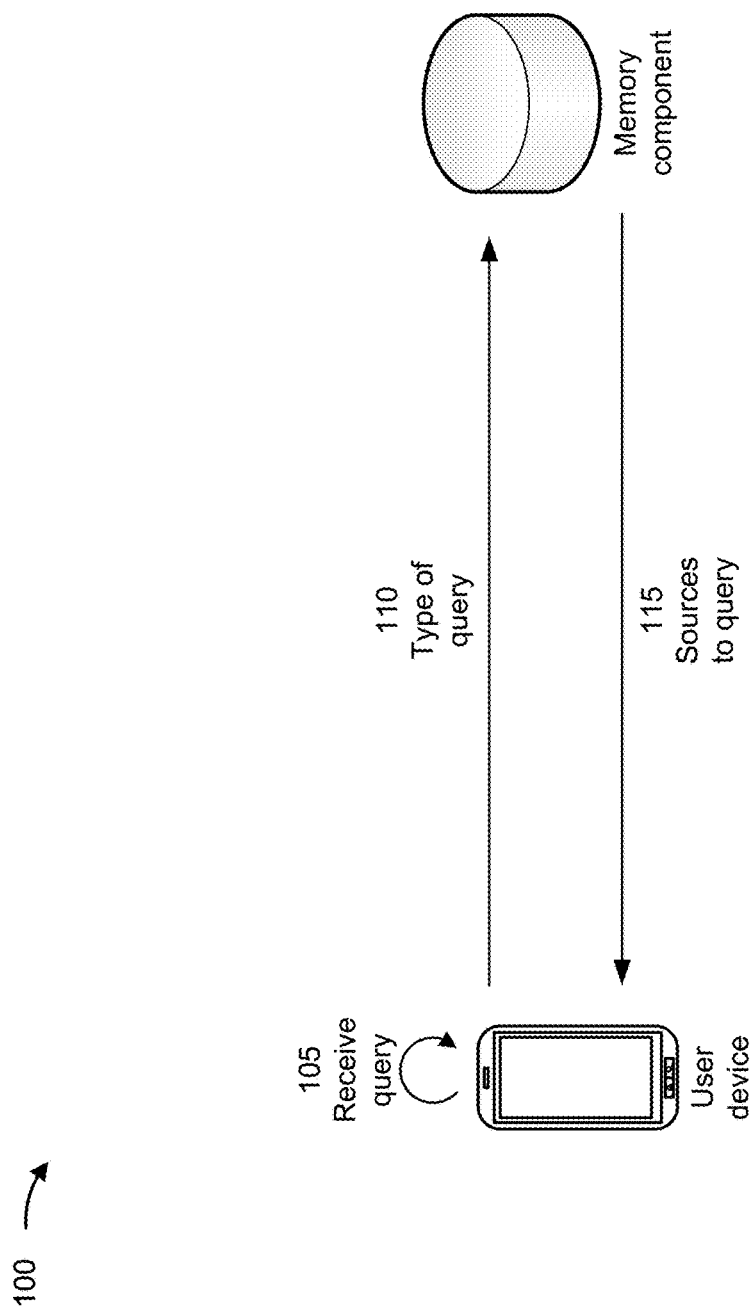
FIGS. 1A-1G are diagrams of an example implementation described herein.

The following detailed description of example implementations refers to the accompanying drawings. The same reference numbers in different drawings may identify the same or similar elements.

Computing devices often perform queries when using identifier-to-value relationships. In one example, a computing device may query a search engine to map search terms to uniform resource locators (URLs). In another example, a computing device may query a domain name service (DNS) to map domain names to Internet protocol (IP) addresses. A computing device may query a certificate service to map certificate names to certificate keys. In another example, a computing device may query an autonomous system number (ASN) service to map ASNs to a classless inter-domain routing (CIDR) value. A computing device may query an address resolution protocol (ARP) service to map medium access control (MAC) addresses to IP addresses. In another example, a computing device may query a border gateway protocol (BGP) service to map an ASN to a subnet identifier. A computing device may query a dynamic host configuration protocol (DHCP) service to map a device identifier to an assigned IP address. In another example, a computing device may query a lightweight directory access protocol (LDAP) service to map an account identifier to a ticket identifier. A computing device may query a network time protocol (NTP) server to map a request to a time value. In another example, a computing device may query a controller to map a decentralized identifier (DID) to a document. For example, a computing device may query a node to map a transaction identifier, a wallet address, a contract identifier, and/or a token identifier to a block identifier. More generally, a computing device may query a database to map a record identifier to a record value.

Such queries typically are performed over networks, such as cellular networks, the Internet, intranets, and/or another type of network. Generally, for a particular type of query, a user device will store an identifier of a data source to use. Accordingly, the user device may transmit a message encoding a query to the data source. However, this message is subject to multiple attacks. For example, man-in-the-middle attacks may result in the user device receiving a spoofed response or at least a tampered response. Reducing risk of man-in-the-middle attacks by using checksums and/or another integrity validation consumes power and processing resources at the user device and at the data source. Additionally, attackers that compromise the data source itself can generate false responses that still pass the integrity validation. Further reducing risk by using encryption consumes additional power and processing resources at the user device and at the data source. Additionally, attackers that compromise hardware and/or a kernel of the user device itself can temper with responses without spoiling encryption. In a peer-to-peer network, attackers may flood the user device with malicious nodes in order to control responses to queries from the user device on account of controlling a majority of peer connections with the user device.

Diversifying a query across multiple data sources and optionally across multiple networks and/or interfaces improves security with low overhead. Some implementations described herein enable a user device to transmit multiple messages encoding duplicate queries to multiple data sources. The user device may further use different networks and/or different interfaces to transmit the different messages. As a result, security is improved because the user device may detect attacks by comparing responses from the multiple data sources. Furthermore, the user device may conserve power and processing resources because transmitting multiple messages consumes less power and processing resources as compared with encryption.

FIGS. 1A-1G are diagrams of an example implementation 100 associated with data authentication and validation across multiple sources, interfaces, and networks. As shown in FIGS. 1A-1G, example implementation 100 includes a user device, a first data source, a second data source, a third data source, and a remote server. These devices are described in more detail below in connection with FIG. 4 and FIG. 5.

As shown in FIG. 1A and by reference number 105, the user device may receive a query. In some implementations, the user device may generate the query in response to input from a user of the user device. The user device may display a user interface (UI), and the user may provide the input in response to the UI using an input component. For example, the user device may execute a web browser, and the user may provide input by interacting with a UI of the web browser. Alternatively, the user of the user device may input the query directly. The user may provide the query using a command line, a bash shell, or another type of text interface. For example, the user may enter a wget command or another type of command including the query into the text interface. Alternatively, the user device may receive the query from a cache or another type of memory associated with the user device. The user device may transmit the query according to a schedule. For example, the user device may periodically execute the query in order to update a file or another locally stored data structure.

As shown by reference number 110, the user device may input a type of the query into a formula, a database, or another type of data structure stored in a memory component associated with the user device. For example, the type of the query may be a search engine query, a DNS query, a certificate query, an ASN query, an ARP query, a BGP query, a DHCP query, an LDAP query, a structured query language (SQL) query, a NoSQL query, an NTP query, a DID query, or a blockchain query among other examples.

As shown by reference number 115, the data structure (stored in the memory component) may return indications of data sources to query. The data structure may output IP addresses, application programming interface (API) endpoints, and/or another similar set of network identifiers for the data sources based on the type of the query. In some implementations, the data structure may be a formula or a database that accepts the type of the query as input and outputs the indications of the data sources. Alternatively, the data structure may include a plurality of files, where each file is associated with a corresponding type of query and indicates the data sources to use for that type of query. Accordingly, the user device may have multiple data sources to use for the query. Although example implementation 100 is described in connection with three data sources, other implementations may use only two data sources or additional data sources (e.g., four data sources, five data sources, and so on).

Figure 1B:
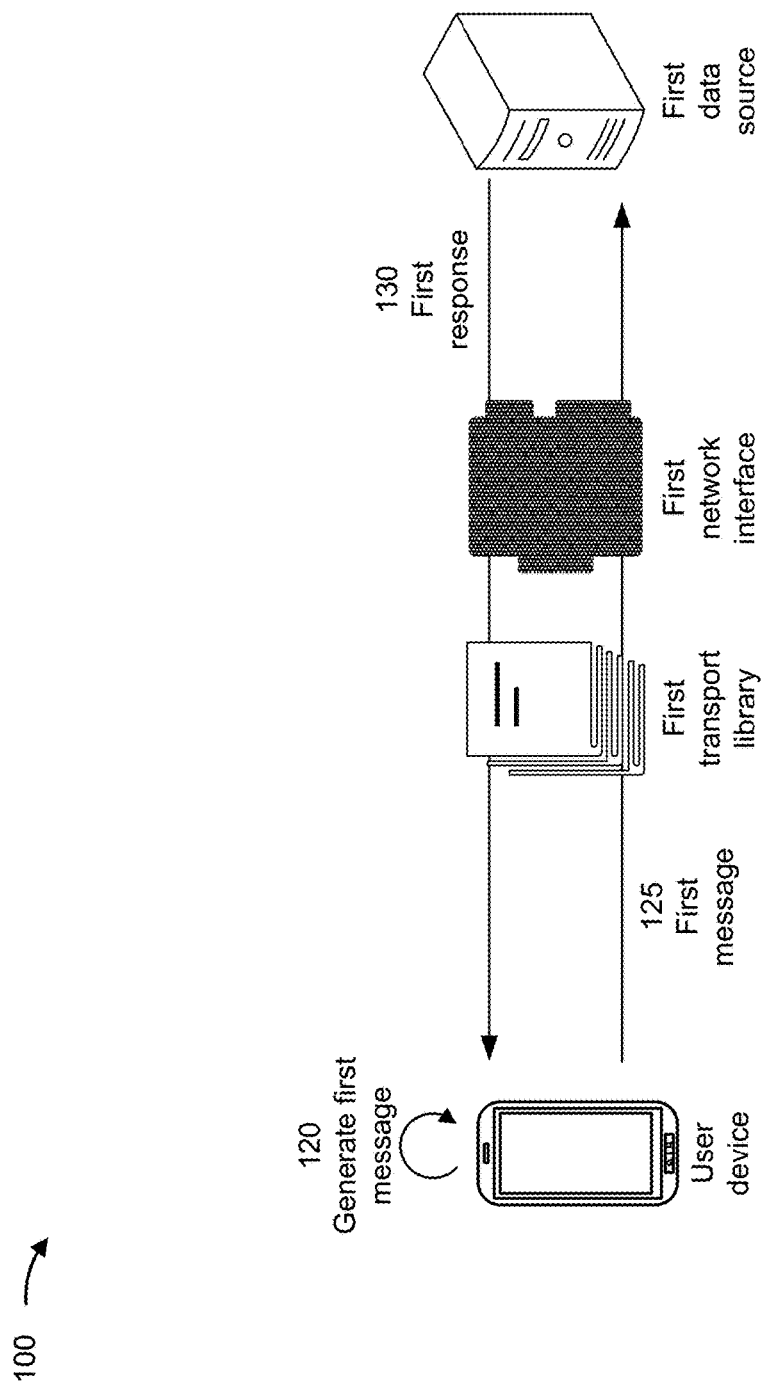

As shown in FIG. 1B and by reference number 120, the user device may generate a first message encoding the query. The first message may include a packet (e.g., one or more packets) to be encoded at a transport layer and transmitted to the first data source via a hardware interface and over a network. In some implementations, the user device may generate the first message using a first application layer protocol (e.g., implemented at an application layer). For example, the first application layer protocol may include hypertext transfer protocol (HTTP) or secure HTTP (HTTPS), transport layer security (TLS) protocol, secure shell (SSH) protocol, secure file transfer protocol (SFTP), the onion router (TOR) protocol, and/or interplanetary file system (IPFS) protocol, among other examples. Accordingly, the application layer may generate a service data unit (SDU) (e.g., one or more SDUs) that encapsulates the first message (e.g., as a payload) including the query.

As shown by reference number 125, the user device may transmit, and the first data source may receive, the first message. As shown in FIG. 1B, the application layer may pass the SDU to a first transport library (e.g., implemented at a transport layer). For example, the first transport library may include transmission control protocol (TCP), user datagram protocol (UDP), Internet control message protocol (ICMP), QUIC protocol, datagram congestion control protocol (DCCP), stream control transmission protocol (SCTP), and/or resource reservation protocol (RSVP), among other examples. Accordingly, the transport layer may generate a protocol data unit (PDU) (e.g., one or more PDUs) that encapsulates the SDU from the application layer.

As further shown in FIG. 1B, the transport layer may pass the PDU to a first network interface (e.g., representing a physical (PHY) layer, also referred to as a "link layer" or "data link layer"). For example, the first network interface may include an Ethernet interface (e.g., using a registered jack (RJ) 45 port), a fiber interface (e.g., using a fiber channel (FC) connector, also referred to as a "ferrule connector"), a WiFi interface (e.g., based on Institute of Electrical and Electronics Engineers (IEEE) local area network (LAN)/metropolitan area network (MAN) standards committee's 802.11 technical standards (IEEE 802.11)), and/or a cellular interface (e.g., based on long term evolution (LTE) standards, 4G standards, 5G standards, and/or another set of standards promulgated by the Third Generation Partnership Project (3GPP)), among other examples. Accordingly, the PHY layer may generate and transmit electromagnetic signals that encode the first message for eventual decoding at the first data source.

As shown by reference number 130, the first data source may process the query and may transmit, and the user device may receive, a first response to the query. The first data source may map the identifier indicated in the query to a value corresponding to the identifier. Accordingly, the first data source may generate the first response including the value. The first data source may encapsulate the first response using an application layer, a transport layer, and a PHY layer similarly as described above for the user device.

As shown in FIG. 1B, the user device may receive the first response via the first network interface and decode the first response using the first transport library to deliver an answer to the query (e.g., the value included in the first response) to the application layer.

Figure 1C:
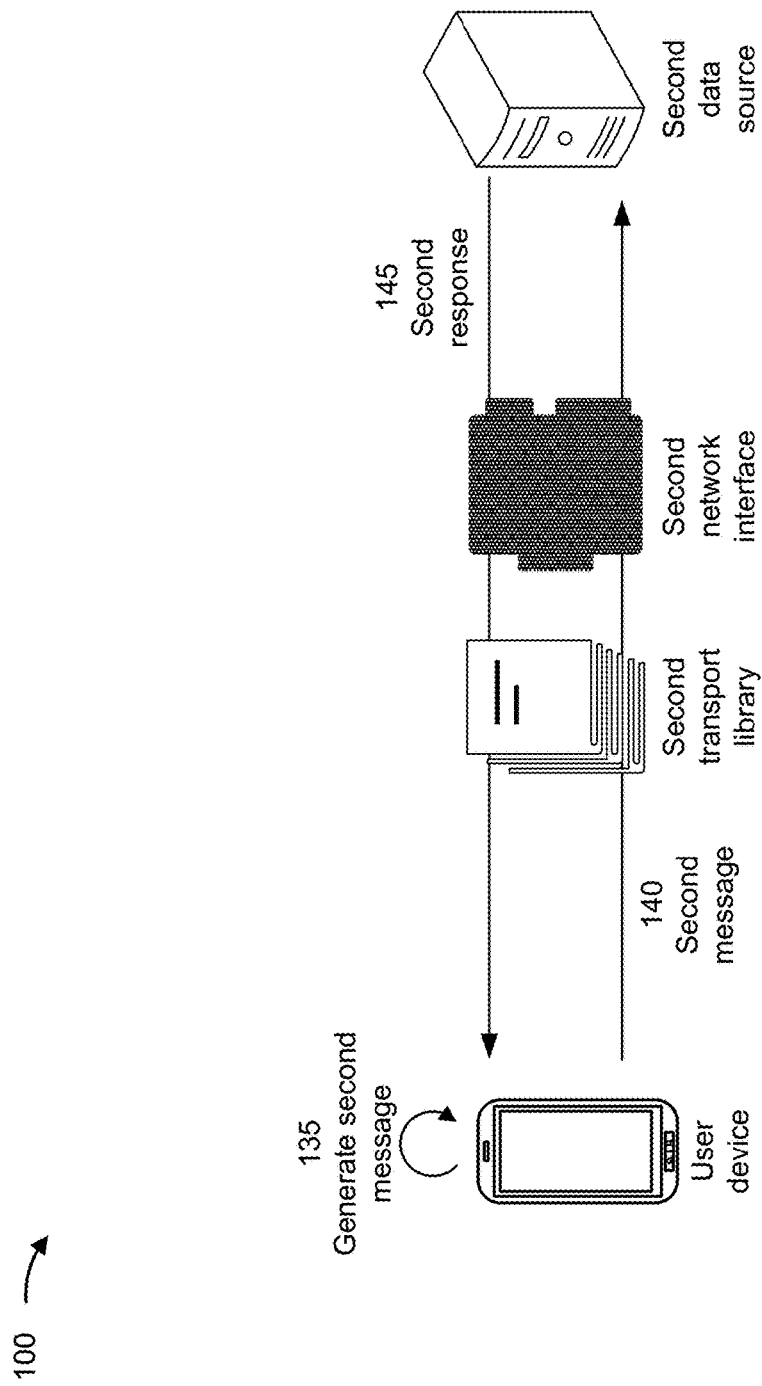

Similarly, as shown in FIG. 1C and by reference number 135, the user device may generate a second message encoding the query. Accordingly, the second message encodes a duplicate of the query encoded in the first message. The second message may include a packet (e.g., one or more packets) to be encoded at a transport layer and transmitted to the second data source via a hardware interface and over a network. In some implementations, the user device may generate the second message using a second application layer protocol (e.g., implemented at the application layer). For example, the second application layer protocol may include HTTP or HTTPS, TLS protocol, SSH protocol, SFTP, TOR protocol, and/or IPFS protocol, among other examples. Accordingly, the application layer may generate an SDU (e.g., one or more SDUs) that encapsulates the second message (e.g., as a payload) including the query.

The user device may use a different protocol as the second application protocol as compared with the first application protocol. Accordingly, the user device diversifies the query across multiple message encoding protocols. As a result, security is improved because an attacker would have to tamper with, or spoof, multiple message protocols in order for the user device to accept a tampered or spoofed answer to the query. Furthermore, using multiple message encoding protocols conserves power and processing resources as compared with costly encryption procedures and/or additional security measures.

As shown by reference number 140, the user device may transmit, and the second data source may receive, the second message. As shown in FIG. 1C, the application layer may pass the SDU to a second transport library (e.g., implemented at the transport layer). For example, the second transport library may include TCP, UDP, ICMP, QUIC protocol, DCCP, SCTP, and/or RSVP, among other examples. Accordingly, the transport layer may generate a PDU (e.g., one or more PDUs) that encapsulates the SDU from the application layer.

The user device may use a different transport library as the second transport library as compared with the first transport library. Accordingly, the user device diversifies the query across multiple transport libraries. As a result, security is improved because an attacker would have to tamper with, or spoof, multiple transport libraries in order for the user device to accept a tampered or spoofed answer to the query. Furthermore, using multiple transport libraries conserves power and processing resources as compared with costly encryption procedures and/or additional security measures.

As further shown in FIG. 1C, the transport layer may pass the PDU to a second network interface (e.g., representing the PHY layer). For example, the second network interface may include an Ethernet interface (e.g., using an RJ45 port), a fiber interface (e.g., using an FC) connector), a WiFi interface (e.g., based on IEEE 802.11), and/or a cellular interface (e.g., based on 3GPP standards), among other examples. Accordingly, the PHY layer may generate and transmit electromagnetic signals that encode the second message for eventual decoding at the second data source.

The user device may use a different network interface as the second network interface as compared with the first network interface. Accordingly, the user device diversifies the query across multiple network interfaces. As a result, security is improved because an attacker would have to tamper with multiple network interfaces in order for the user device to accept a tampered answer to the query. Furthermore, using multiple network interfaces conserves power and processing resources as compared with costly encryption procedures and/or additional security measures.

As shown by reference number 145, the second data source may process the query and may transmit, and the user device may receive, a second response to the query. The second data source may map the identifier indicated in the query to a value corresponding to the identifier. Accordingly, the second data source may generate the second response including the value. The second data source may encapsulate the second response using an application layer, a transport layer, and a PHY layer similarly as described above for the user device.

As shown in FIG. 1C, the user device may receive the second response via the second network interface and decode the second response using the second transport library to deliver an answer to the query (e.g., the value included in the second response) to the application layer.

Although described above in connection with the second transport library being different than the first transport library, the user device may use a virtual transport library (e.g., over the first transport library) as the second transport library, as described in connection with FIG. 2. Additionally, or alternatively, although described above in connection with the second network interface being different than the first network interface, the user device may use a virtual network interface (e.g., over the first network interface) as the second network interface, as described in connection with FIG. 3.

Figure 1D:
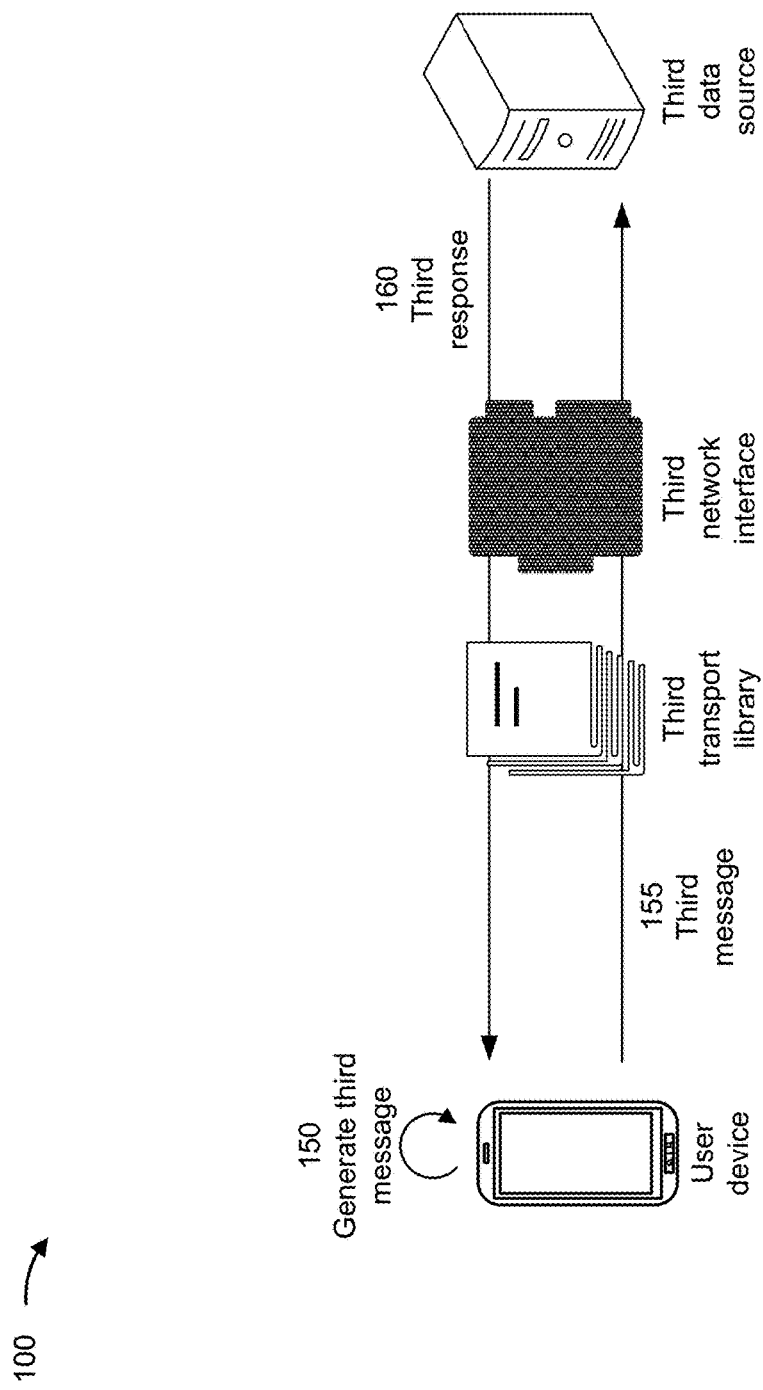

As shown in FIG. 1D and by reference number 150, the user device may generate a third message encoding the query. Accordingly, the third message encodes a duplicate of the query encoded in the first and second messages. The third message may include a packet (e.g., one or more packets) to be encoded at a transport layer and transmitted to the third data source via a hardware interface and over a network. In some implementations, the user device may generate the third message using a third application layer protocol (e.g., implemented at the application layer). For example, the third application layer protocol may include HTTP or HTTPS, TLS protocol, SSH protocol, SFTP, TOR protocol, and/or IPFS protocol, among other examples.

Accordingly, the application layer may generate an SDU (e.g., one or more SDUs) that encapsulates the third message (e.g., as a payload) including the query.

The user device may use a different protocol as the third application protocol as compared with the first and second application protocols. Accordingly, the user device diversifies the query across multiple message encoding protocols. As a result, security is improved because an attacker would have to tamper with, or spoof, multiple message protocols in order for the user device to accept a tampered or spoofed answer to the query. Furthermore, using multiple message encoding protocols conserves power and processing resources as compared with costly encryption procedures and/or additional security measures.

As shown by reference number 155, the user device may transmit, and the third data source may receive, the third message. As shown in FIG. 1D, the application layer may pass the SDU to a third transport library (e.g., implemented at the transport layer). For example, the third transport library may include TCP, UDP, ICMP, QUIC protocol, DCCP, SCTP, and/or RSVP, among other examples. Accordingly, the transport layer may generate a PDU (e.g., one or more PDUs) that encapsulates the SDU from the application layer.

The user device may use a different transport library as the third transport library as compared with the first and second transport libraries. Accordingly, the user device diversifies the query across multiple transport libraries. As a result, security is improved because an attacker would have to tamper with, or spoof, multiple transport libraries in order for the user device to accept a tampered or spoofed answer to the query. Furthermore, using multiple transport libraries conserves power and processing resources as compared with costly encryption procedures and/or additional security measures.

As further shown in FIG. 1D, the transport layer may pass the PDU to a third network interface (e.g., representing the PHY layer). For example, the third network interface may include an Ethernet interface (e.g., using an RJ45 port), a fiber interface (e.g., using an FC) connector), a WiFi interface (e.g., based on IEEE 802.11), and/or a cellular interface (e.g., based on 3GPP standards), among other examples. Accordingly, the PHY layer may generate and transmit electromagnetic signals that encode the third message for eventual decoding at the third data source.

The user device may use a different network interface as the third network interface as compared with the first and second network interfaces. Accordingly, the user device diversifies the query across multiple network interfaces. As a result, security is improved because an attacker would have to tamper with multiple network interfaces in order for the user device to accept a tampered answer to the query. Furthermore, using multiple network interfaces conserves power and processing resources as compared with costly encryption procedures and/or additional security measures.

As shown by reference number 160, the third data source may process the query and may transmit, and the user device may receive, a third response to the query. The third data source may map the identifier indicated in the query to a value corresponding to the identifier. Accordingly, the third data source may generate the third response including the value. The third data source may encapsulate the third response using an application layer, a transport layer, and a PHY layer similarly as described above for the user device.

As shown in FIG. 1D, the user device may receive the third response via the third network interface and decode the third response using the third transport library to deliver an answer to the query (e.g., the value included in the third response) to the application layer.

Although described above in connection with the third transport library being different than the first and second transport libraries, the user device may use a virtual transport library (e.g., over the first transport library or the second transport library) as the third transport library, as described in connection with FIG. 2. Additionally, or alternatively, although described above in connection with the third network interface being different than the first and second network interfaces, the user device may use a virtual network interface (e.g., over the first network interface or the second network interface) as the third network interface, as described in connection with FIG. 3.

Figure 1E:
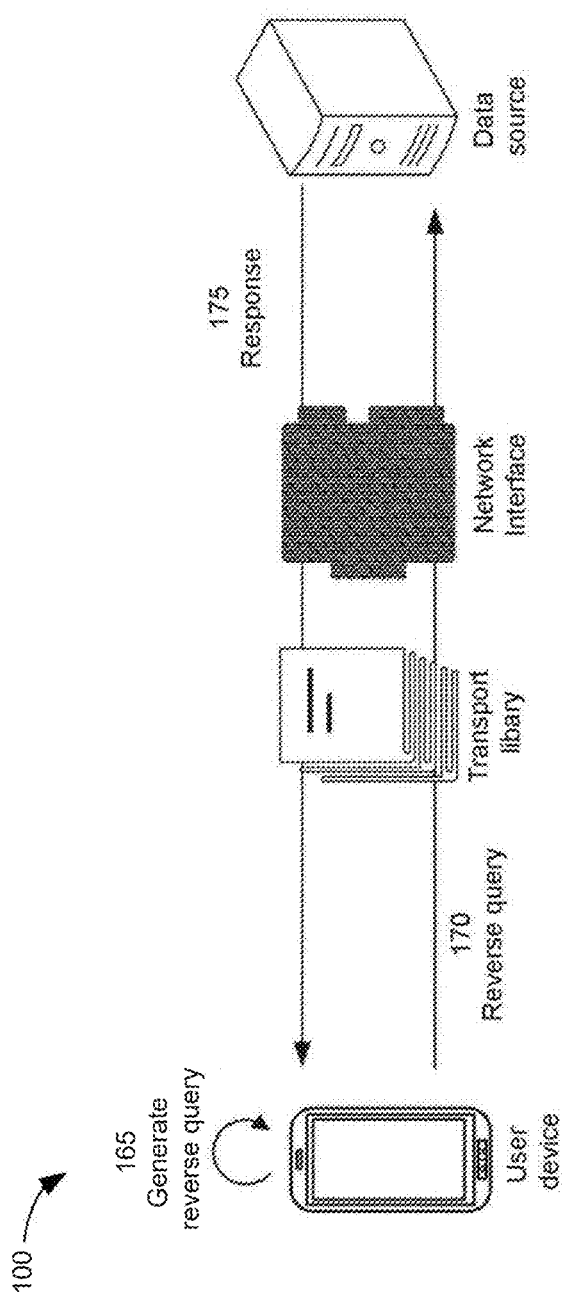

In order to further improve security, the user device may generate a reverse query encoding one of the received responses, as shown in FIG. 1E and by reference number 165. As shown in FIG. 1E, the reverse query may include a packet (e.g., one or more packets) to be encoded at a transport layer and transmitted to a selected one of the data sources via a hardware interface and over a network. The reverse query may be based on the second response and thus transmitted to the first data source and/or the third data source. Alternatively, the reverse query may be based on the third response and thus transmitted to the first data source and/or the second data source. Alternatively, the reverse query may be based on the first response and thus transmitted to the second data source and/or the third data source.

As shown by reference number 170, the user device may transmit, and the selected data source may receive, the reverse query. The user device may use the same application layer protocol, transport library, and network interface that was previously used for the selected data source. For example, when the selected data source is the first data source, the user device may transmit the reverse query using the first application layer protocol, the first transport library, and the first network interface. Similarly, when the selected data source is the second data source, the user device may transmit the reverse query using the second application layer protocol, the second transport library, and the second network interface. Similarly, when the selected data source is the third data source, the user device may transmit the reverse query using the third application layer protocol, the third transport library, and the third network interface.

As shown by reference number 175, the selected data source may process the reverse query and may transmit, and the user device may receive, a response to the reverse query. The selected data source may map the value indicated in the query to an identifier corresponding to the query. Accordingly, the selected data source may generate the response to the reverse query including the identifier. The selected data source may encapsulate the response to the reverse query using an application layer, a transport layer, and a PHY layer similarly as described above for the user device.

As shown in FIG. 1E, the user device may receive the response to the reverse query via the same network interface used to transmit the reverse query and decode the response to the reverse query using the same transport library used to transmit the reverse query in order to deliver an answer to the reverse query (e.g., the identifier included in the response) to the application layer. Although example implementation 100 is described in connection with one reverse query, the user device may transmit a plurality of reverse queries, in other implementations.

Figure 1F:
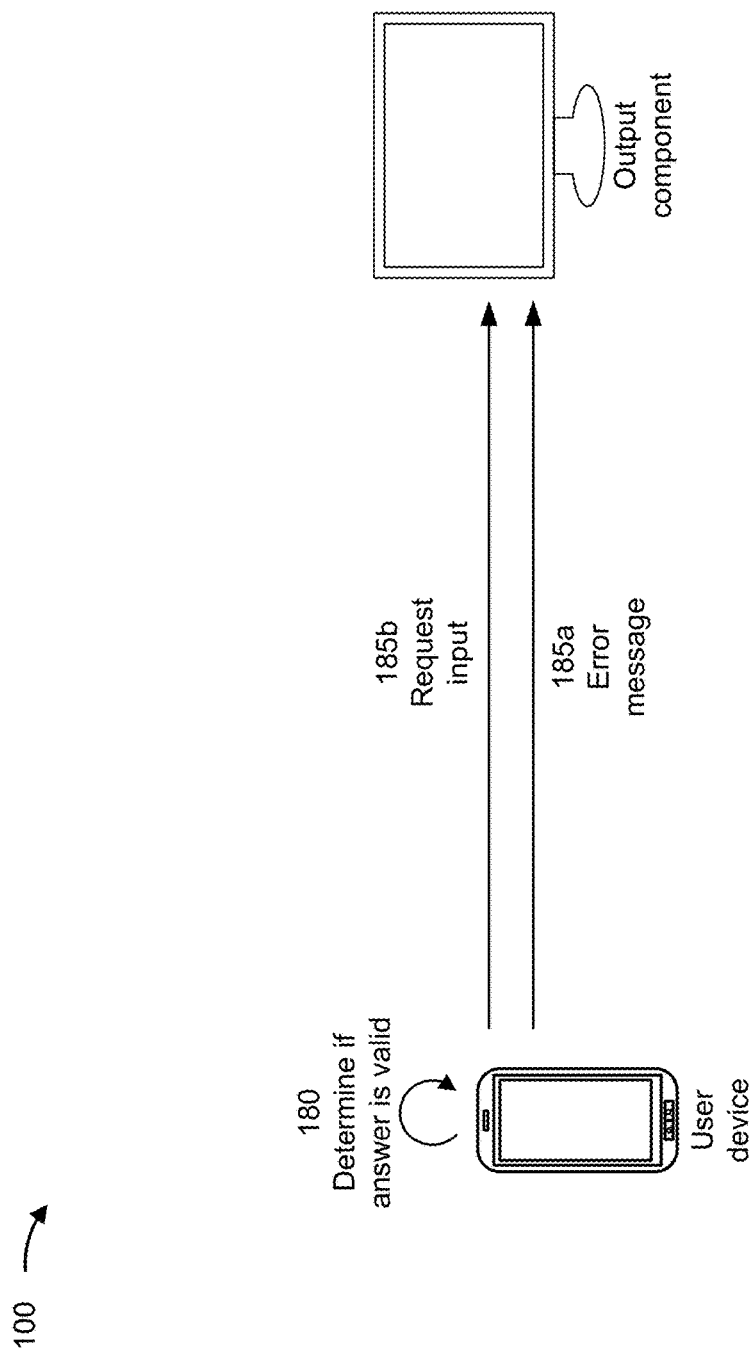

As shown in FIG. 1F and by reference number 180, the user device may determine whether an answer to the query is valid based on the first response, the second response, the third response, and the response to the reverse query. For example, the user device may select a value from the first response as the answer to test, a value from the second response as the answer to test, or a value from the third response as the answer to test. The selection may be random (or at least pseudo-random), temporality-based (e.g., selecting the first response because the first response was received before the second and third responses), or rotation-based (e.g., using a round robin procedure by selecting the first response during a first implementation, the second response during a second implementation, and so on, or using another type of rotation).

In FIG. 1F, the user device may determine that the answer is invalid. In some implementations, the user device may determine that the answer is invalid when the values from the first response, the second response, and the third response do not agree (e.g., do not agree within a margin of error or compare in a way that fails a matching threshold, among other examples). Alternatively, the user device may determine that the answer is invalid based on a "majority vote." For example, when no majority of the first response, the second response, and the third response (and optionally including any reverse query responses) agrees, the user device may determine that the answer is invalid. In any of the implementations described above, the user device may first discard any responses that do not agree with corresponding reverse query responses. For example, the user device may discard the first response when a reverse query, including the answer from the first response, to the second data source and/or to the third data source results in an identifier that is different from the identifier in the first message. Similarly, the user device may discard the second response when a reverse query, including the answer from the second response, to the first data source and/or to the third data source results in an identifier that is different from the identifier in the second message. Similarly, the user device may discard the third response when a reverse query, including the answer from the third response, to the first data source and/or to the second data source results in an identifier that is different from the identifier in the third message. In some implementations, the user device may determine that the answer is invalid when a quantity of responses received is larger than a quantity of messages transmitted. For example, receiving more responses than messages may be indicative of a race attack.

As shown by reference number 185a, the user device may generate an error message when the answer to the query is invalid. For example, the user device may use an output component to display (e.g., visually), play (e.g., auditorily), and/or otherwise indicate to the user that the answer is invalid. Accordingly, the user may debug the problem to determine whether the user device has been compromised and/or which data source has been compromised.

Additionally, or alternatively, as shown by reference number 185b, the user device may request input from the user. For example, the user device may use an output component to ask the user (e.g., visually and/or auditorily) whether to proceed even though the answer may be invalid. For example, a web browser on the user device may ask the user whether to proceed even though a DNS lookup resulted in an invalid answer. Accordingly, the user may determine whether to proceed.

Figure 1G:
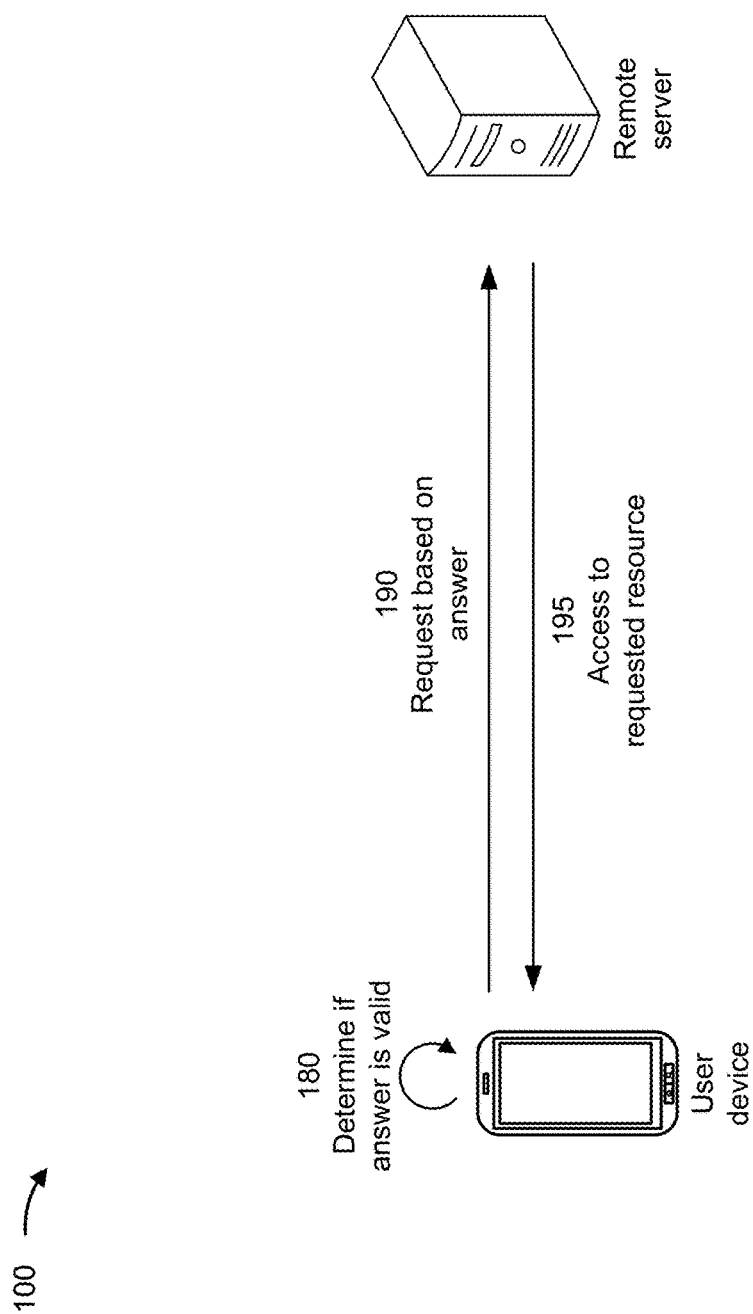

Alternatively, as shown in FIG. 1G, the user device may determine that the answer is valid. In some implementations, the user device may determine that the answer is valid when the values from the first response, the second response, and the third response agree (e.g., match within a margin of error or match in a way that satisfies a matching threshold, among other examples). Alternatively, the user device may determine that the answer is valid based on a "majority vote." For example, when a majority of the first response, the second response, and the third response (and optionally including any reverse query responses) agrees, the user device may determine that the answer is valid. In any of the implementations described above, the user device may first discard any responses that do not agree with corresponding reverse query responses. For example, the user device may discard the first response when a reverse query, including the answer from the first response, to the second data source and/or to the third data source results in an identifier that is different from the identifier in the first message. Similarly, the user device may discard the second response when a reverse query, including the answer from the second response, to the first data source and/or to the third data source results in an identifier that is different from the identifier in the second message. Similarly, the user device may discard the third response when a reverse query, including the answer from the third response, to the first data source and/or to the second data source results in an identifier that is different from the identifier in the third message. In some implementations, the user device may additionally determine that the answer is valid when a quantity of responses received is the same as a quantity of messages transmitted.

As shown by reference number 190, the user device may request, from the remote server, a resource based on the answer. For example, the answer may include an IP address of the remote server based on a domain name entered by the user. Accordingly, as shown by reference number 195, the remote server may provide, to the user device, access to the requested resource (e.g., a website or another type of Internet resource). Although described in connection with a DNS lookup, the user device may similarly proceed based on other types of valid answers.

By using techniques as described in connection with FIGS. 1A-1G, the user device transmits multiple messages encoding the query to multiple data sources. The user device may use different network interfaces and different transport libraries to transmit the different messages. As a result, security is improved because the user device may detect attacks by comparing responses from the multiple data sources. Furthermore, the user device may conserve power and processing resources because transmitting multiple messages consumes less power and processing resources as compared with encryption and/or additional security measures.

As indicated above, FIGS. 1A-1G are provided as an example. Other examples may differ from what is described with regard to FIGS. 1A-1G. The number and arrangement of devices shown in FIGS. 1A-1G are provided as an example. In practice, there may be additional devices, fewer devices, different devices, or differently arranged devices than those shown in FIGS. 1A-1G. Furthermore, two or more devices shown in FIGS. 1A-1G may be implemented within a single device, or a single device shown in FIGS. 1A-1G may be implemented as multiple, distributed devices. Additionally, or alternatively, a set of devices (e.g., one or more devices) shown in FIGS. 1A-1G may perform one or more functions described as being performed by another set of devices shown in FIGS. 1A-1G.

Figure 2:
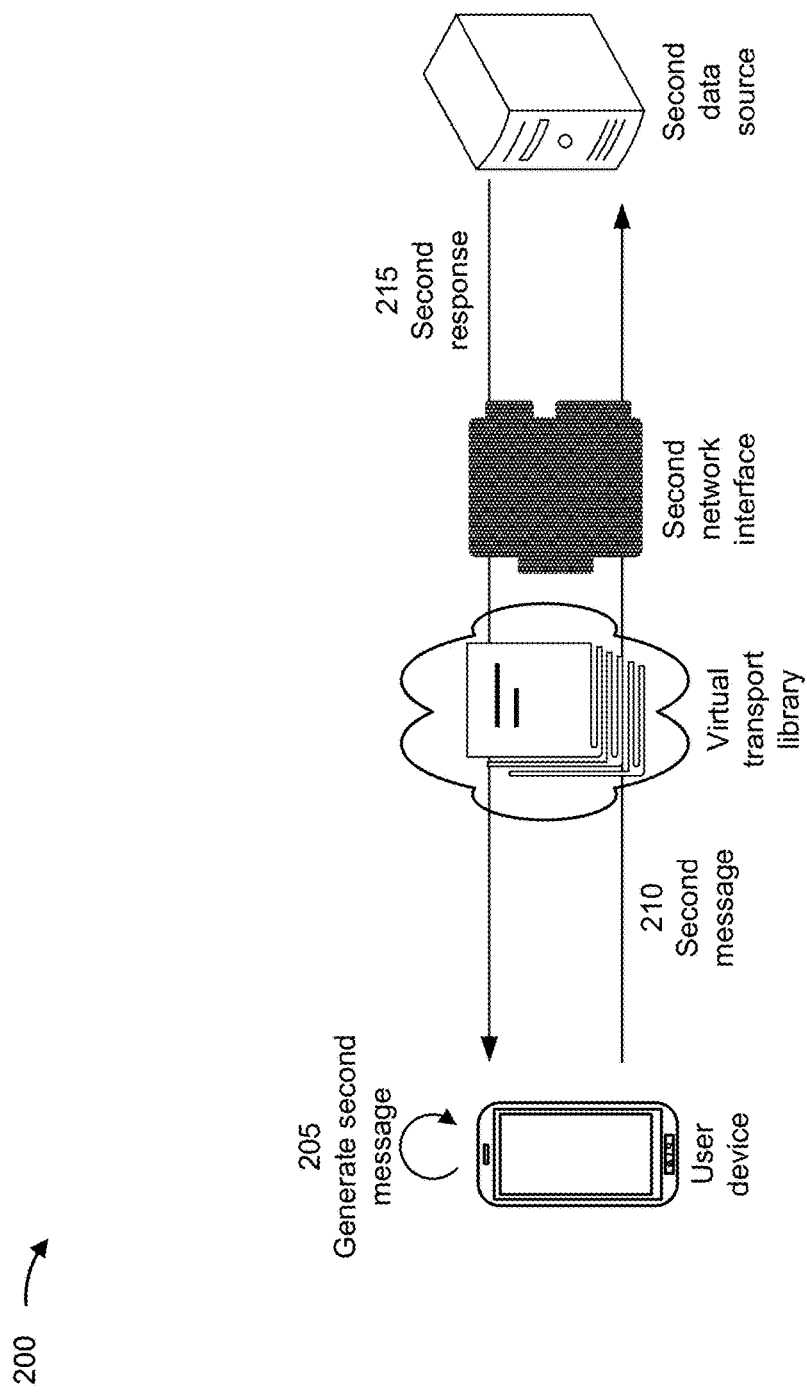
FIG. 2 is a diagram of an example implementation described herein.

FIG. 2 is a diagram of an example implementation 200 associated with data authentication and validation across a virtual transport library. As shown in FIG. 2, example implementation 200 includes a user device and a second data source. These devices are described in more detail below in connection with FIG. 4 and FIG. 5.

As shown by reference number 205, the user device may generate a second message encoding a query. For example, the second message may encode a duplicate of a query encoded in a first message, as described in connection with FIG. 1B. The second message may include a packet (e.g., one or more packets) to be encoded at a transport layer and transmitted to a second data source via a hardware interface and over a network. In some implementations, the user device may generate the second message using a second application layer protocol (e.g., implemented at the application layer). For example, the second application layer protocol may include HTTP or HTTPS, TLS protocol, SSH protocol, SFTP, TOR protocol, and/or IPFS protocol, among other examples. Accordingly, the application layer may generate an SDU (e.g., one or more SDUs) that encapsulates the second message (e.g., as a payload) including the query.

As shown by reference number 210, the user device may transmit, and the second data source may receive, the second message. As shown in FIG. 2, the application layer may pass the SDU to a virtual transport library (e.g., implemented at the transport layer and over a first transport library). For example, the first transport library may include TCP and may support a virtual circuit (e.g., the virtual transport library), for example, to provide connection-oriented communication over an underlying packet-oriented datagram network. Similarly, in another example, the first transport library may include SCTP and may support a virtual circuit (e.g., the virtual transport library). Accordingly, the virtual transport layer may generate a PDU (e.g., one or more PDUs) that encapsulates the SDU from the application layer.

As further shown in FIG. 2, the virtual transport layer may pass the PDU to a second network interface (e.g., representing a PHY layer). For example, the second network interface may include an Ethernet interface (e.g., using an RJ45 port), a fiber interface (e.g., using an FC connector), a WiFi interface (e.g., based on IEEE 802.11), and/or a cellular interface (e.g., based on 3GPP standards), among other examples. Accordingly, the PHY layer may generate and transmit electromagnetic signals that encode the second message for eventual decoding at the second data source.

As shown by reference number 215, the second data source may process the query and may transmit, and the user device may receive, a second response to the query. The second data source may map the identifier indicated in the query to a value corresponding to the identifier. Accordingly, the second data source may generate the second response including the value. The second data source may encapsulate the second response using an application layer, a transport layer, and a PHY layer similarly as described above for the user device.

As shown in FIG. 2, the user device may receive the second response via the second network interface and decode the second response using the virtual transport library to deliver an answer to the query (e.g., the value included in the second response) to the application layer.

By using techniques as described in connection with FIG. 2, the user device may use virtualization to improve security even when the user device has a single transport library. Furthermore, the user device may conserve power and processing resources because virtualizing a transport library consumes less power and processing resources as compared with encryption and/or additional security measures.

As indicated above, FIG. 2 is provided as an example. Other examples may differ from what is described with regard to FIG. 2.

Figure 3:
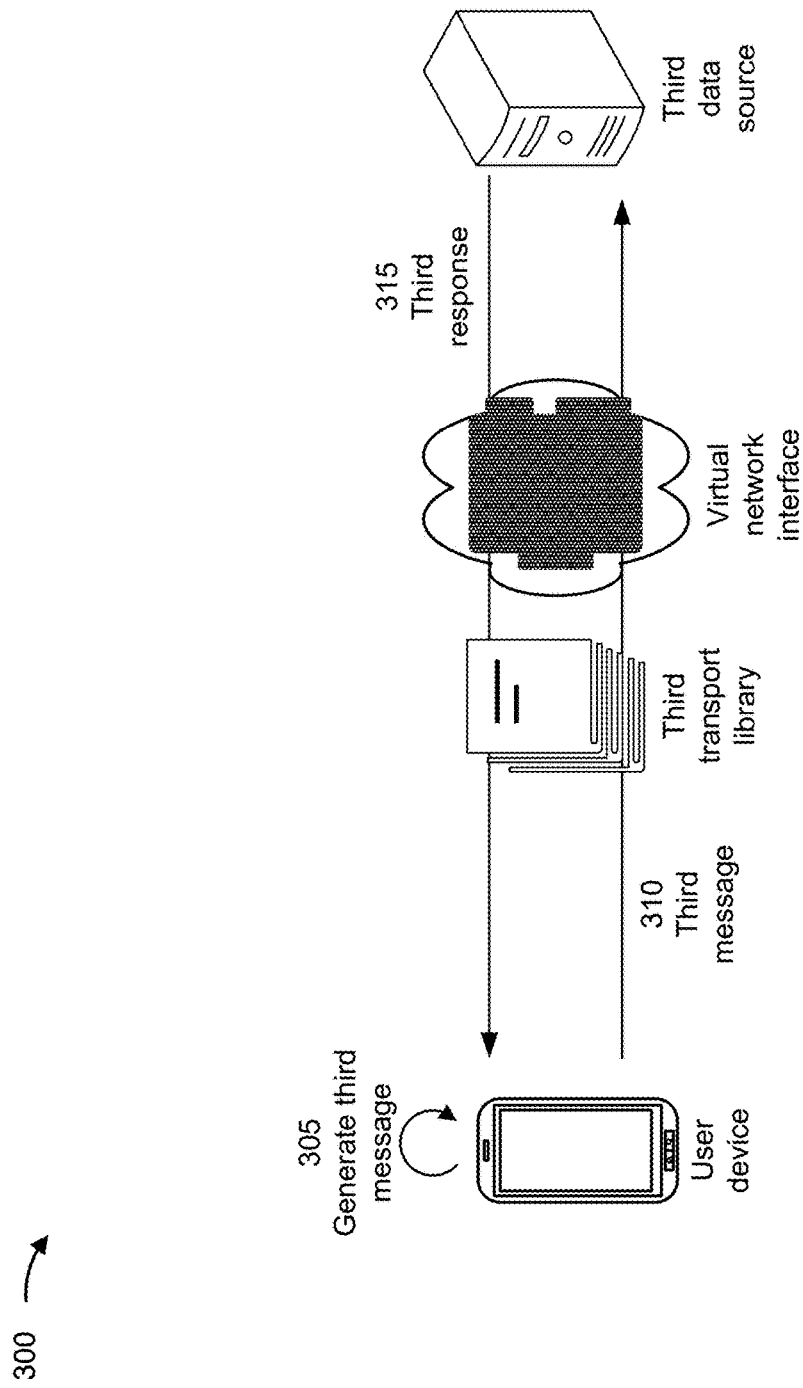
FIG. 3 is a diagram of an example implementation described herein.

FIG. 3 is a diagram of an example implementation 300 associated with data authentication and validation across a virtual network. As shown in FIG. 3, example implementation 300 includes a user device and a third data source. These devices are described in more detail below in connection with FIG. 4 and FIG. 5.

As shown by reference number 305, the user device may generate a third message encoding a query. For example, the third message may encode a duplicate of a query encoded in a second message, as described in connection with FIG. 1C. The third message may include a packet (e.g., one or more packets) to be encoded at a transport layer and transmitted to a third data source via a hardware interface and over a network. In some implementations, the user device may generate the third message using a third application layer protocol (e.g., implemented at the application layer). For example, the third application layer protocol may include HTTP or HTTPS, TLS protocol, SSH protocol, SFTP, TOR protocol, and/or IPFS protocol, among other examples. Accordingly, the application layer may generate an SDU (e.g., one or more SDUs) that encapsulates the third message (e.g., as a payload) including the query.

As shown by reference number 310, the user device may transmit, and the third data source may receive, the third message. As shown in FIG. 3, the application layer may pass the SDU to a third transport library (e.g., implemented at the transport layer). For example, the third transport library may include TCP, UDP, ICMP, QUIC protocol, DCCP, SCTP, and/or RSVP, among other examples. Accordingly, the transport layer may generate a PDU (e.g., one or more PDUs) that encapsulates the SDU from the application layer.

As further shown in FIG. 3, the transport layer may pass the PDU to a virtual network interface (e.g., representing a PHY layer). In some implementations, the virtual network interface may include a virtual network interface controller (NIC). In one example, the user device may virtualize an NIC to use with a fiber optic connection that generally uses a same NIC as an Ethernet connection. In another example, the user device may virtualize an NIC to use with a Bluetooth Low Energy® (BLE) connection that generally uses a same NIC as a Bluetooth® connection. Additionally, or alternatively, the virtual network interface may be based on a virtual network. In one example, the user device may virtualize a network to use with a WiFi connection that relies on the same hardware (e.g., a same modem and/or coaxial port) as an Ethernet connection. Accordingly, the PHY layer may generate and transmit electromagnetic signals that encode the third message for eventual decoding at the third data source.

As shown by reference number 315, the third data source may process the query and may transmit, and the user device may receive, a third response to the query. The third data source may map the identifier indicated in the query to a value corresponding to the identifier. Accordingly, the third data source may generate the third response including the value. The third data source may encapsulate the third response using an application layer, a transport layer, and a PHY layer similarly as described above for the user device.

As shown in FIG. 3, the user device may receive the third response via the virtual network interface and decode the third response using the third transport library to deliver an answer to the query (e.g., the value included in the second response) to the application layer.

By using techniques as described in connection with FIG. 3, the user device may use virtualization to improve security even when the user device has a single network interface. Furthermore, the user device may conserve power and processing resources because virtualizing a network interface consumes less power and processing resources as compared with encryption and/or additional security measures.

As indicated above, FIG. 3 is provided as an example. Other examples may differ from what is described with regard to FIG. 3.

Figure 4:
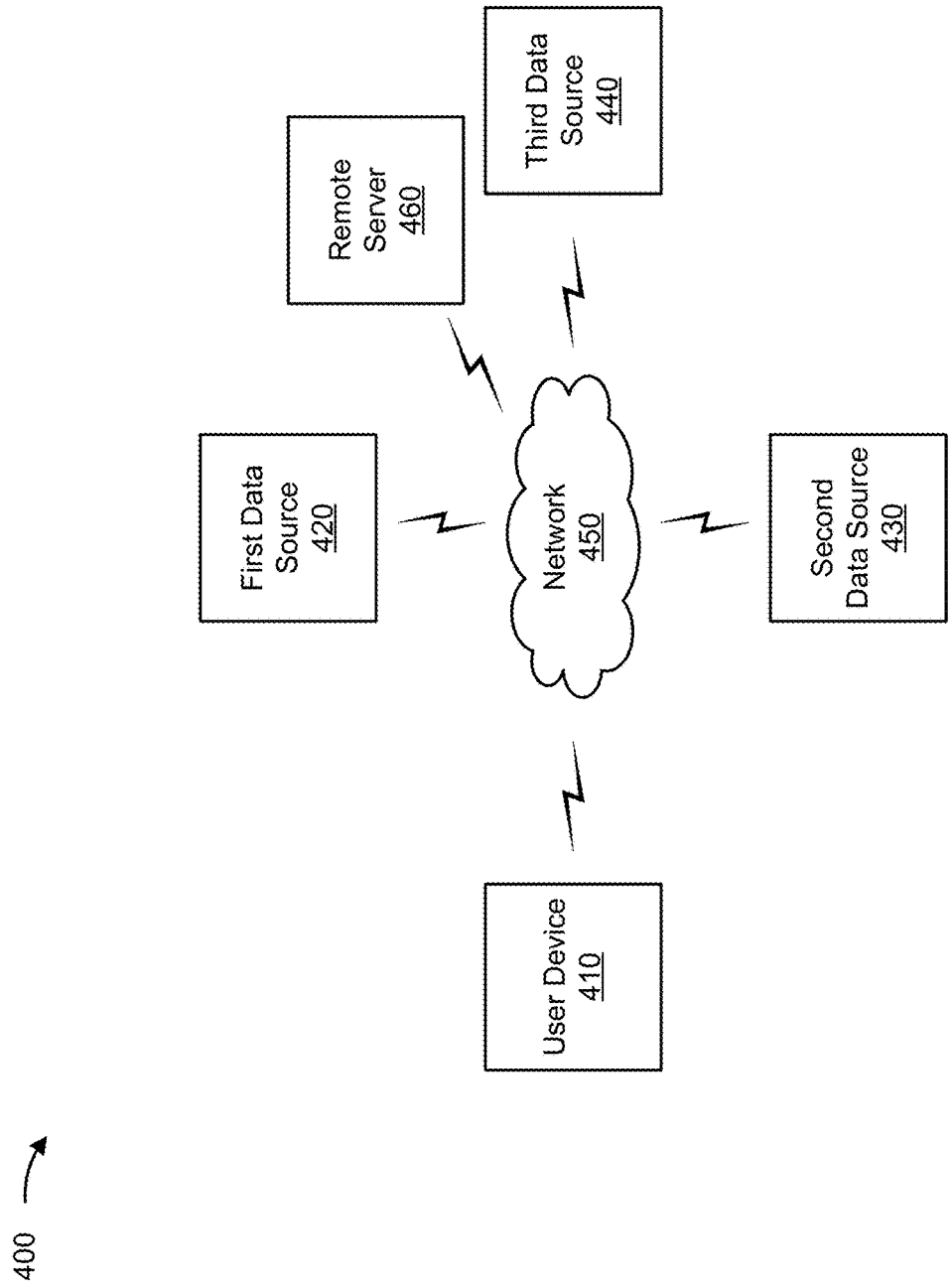
FIG. 4 is a diagram of an example environment in which systems and/or methods described herein may be implemented.

FIG. 4 is a diagram of an example environment 400 in which systems and/or methods described herein may be implemented. As shown in FIG. 4, environment 400 may include a user device 410, a first data source 420, a second data source 430, a third data source 440, a network 450, and a remote server 460. Devices of environment 400 may interconnect via wired connections, wireless connections, or a combination of wired and wireless connections.

The user device 410 may include one or more devices capable of receiving, generating, storing, processing, and/or providing information associated with queries, as described elsewhere herein. The user device 410 may include a communication device and/or a computing device. For example, the user device 410 may include a wireless communication device, a mobile phone, a user equipment, a laptop computer, a tablet computer, a desktop computer, a gaming console, a set-top box, a wearable communication device (e.g., a smart wristwatch, a pair of smart eyeglasses, a head mounted display, or a virtual reality headset), or a similar type of device.

The first data source 420 may include one or more devices capable of receiving, generating, storing, processing, and/or providing information associated with queries, as described elsewhere herein. The first data source 420 may include a communication device and/or a computing device. For example, the first data source 420 may include a database, a server, a database server, an application server, a client server, a web server, a host server, a proxy server, a virtual server (e.g., executing on computing hardware), a server in a cloud computing system, a device that includes computing hardware used in a cloud computing environment, or a similar type of device.

The second data source 430 may include one or more devices capable of receiving, generating, storing, processing, and/or providing information associated with queries, as described elsewhere herein. The second data source 430 may include a communication device and/or a computing device. For example, the second data source 430 may include a database, a server, a database server, an application server, a client server, a web server, a host server, a proxy server, a virtual server (e.g., executing on computing hardware), a server in a cloud computing system, a device that includes computing hardware used in a cloud computing environment, or a similar type of device. The second data source 430 may be separate (e.g., physically, logically, and/or virtually) from the first data source 420. In some implementations, the second data source 430 may communicate over a different network than the first data source 420.

The third data source 440 may include one or more devices capable of receiving, generating, storing, processing, and/or providing information associated with queries, as described elsewhere herein. The third data source 440 may include a communication device and/or a computing device. For example, the third data source 440 may include a database, a server, a database server, an application server, a client server, a web server, a host server, a proxy server, a virtual server (e.g., executing on computing hardware), a server in a cloud computing system, a device that includes computing hardware used in a cloud computing environment, or a similar type of device. The third data source 440 may be separate (e.g., physically, logically, and/or virtually) from the first data source 420 and the second data source 430. In some implementations, the third data source 440 may communicate over a different network than the second data source 430 and/or the first data source 420.

The network 450 may include one or more wired and/or wireless networks. For example, the network 450 may include a wireless wide area network (e.g., a cellular network or a public land mobile network), a local area network (e.g., a wired local area network or a wireless local area network (WLAN), such as a Wi-Fi network), a personal area network (e.g., a Bluetooth network), a near-field communication network, a telephone network, a private network, the Internet, and/or a combination of these or other types of networks. The network 450 enables communication among the devices of environment 400.

The remote server 460 may include one or more devices capable of receiving, generating, storing, processing, providing, and/or routing information associated with websites, as described elsewhere herein. The remote server 460 may include a communication device and/or a computing device. For example, the remote server 460 may include an application server, a client server, a web server, a database server, a host server, a proxy server, a virtual server (e.g., executing on computing hardware), or a server in a cloud computing system. In some implementations, the remote server 460 may include computing hardware used in a cloud computing environment.

The number and arrangement of devices and networks shown in FIG. 4 are provided as an example. In practice, there may be additional devices and/or networks, fewer devices and/or networks, different devices and/or networks, or differently arranged devices and/or networks than those shown in FIG. 4. Furthermore, two or more devices shown in FIG. 4 may be implemented within a single device, or a single device shown in FIG. 4 may be implemented as multiple, distributed devices. Additionally, or alternatively, a set of devices (e.g., one or more devices) of environment 400 may perform one or more functions described as being performed by another set of devices of environment 400.

Figure 5:
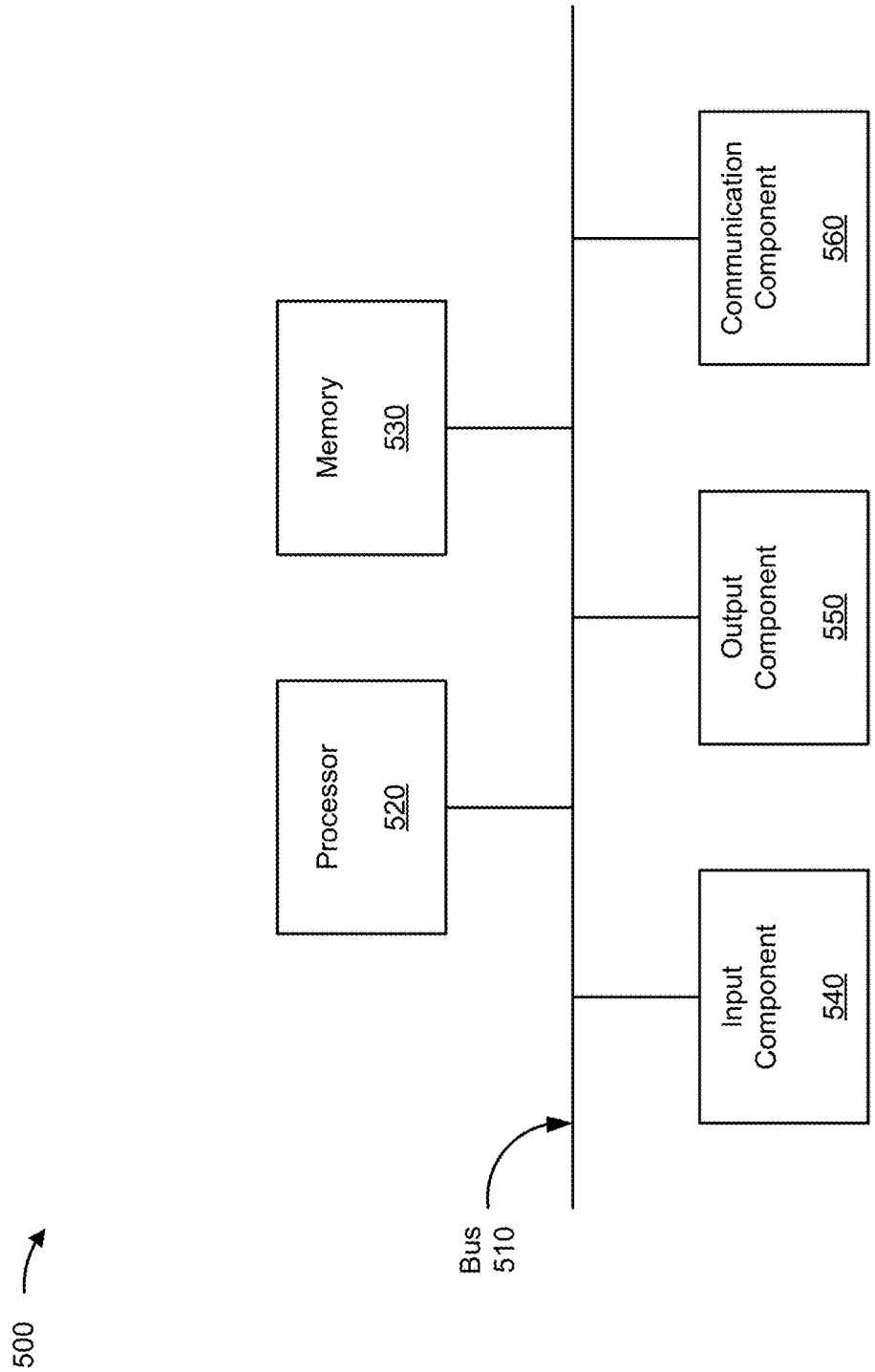
FIG. 5 is a diagram of example components of one or more devices of FIG. 4.

FIG. 5 is a diagram of example components of a device 500 associated with data authentication and validation across multiple sources, interfaces, and networks. The device 500 may correspond to a user device 410, a first data source 420, a second data source 430, a third data source 440, and/or a remote server 460. In some implementations, the user device 410, the first data source 420, the second data source 430, the third data source 440, and/or the remote server 460 may include one or more devices 500 and/or one or more components of the device 500. As shown in FIG. 5, the device 500 may include a bus 510, a processor 520, a memory 530, an input component 540, an output component 550, and/or a communication component 560.

The bus 510 may include one or more components that enable wired and/or wireless communication among the components of the device 500. The bus 510 may couple together two or more components of FIG. 5, such as via operative coupling, communicative coupling, electronic coupling, and/or electric coupling. For example, the bus 510 may include an electrical connection (e.g., a wire, a trace, and/or a lead) and/or a wireless bus. The processor 520 may include a central processing unit, a graphics processing unit, a microprocessor, a controller, a microcontroller, a digital signal processor, a field-programmable gate array, an application-specific integrated circuit, and/or another type of processing component. The processor 520 may be implemented in hardware, firmware, or a combination of hardware and software. In some implementations, the processor 520 may include one or more processors capable of being programmed to perform one or more operations or processes described elsewhere herein.

The memory 530 may include volatile and/or nonvolatile memory. For example, the memory 530 may include random access memory (RAM), read only memory (ROM), a hard disk drive, and/or another type of memory (e.g., a flash memory, a magnetic memory, and/or an optical memory). The memory 530 may include internal memory (e.g., RAM, ROM, or a hard disk drive) and/or removable memory (e.g., removable via a universal serial bus connection). The memory 530 may be a non-transitory computer-readable medium. The memory 530 may store information, one or more instructions, and/or software (e.g., one or more software applications) related to the operation of the device 500. In some implementations, the memory 530 may include one or more memories that are coupled (e.g., communicatively coupled) to one or more processors (e.g., processor 520), such as via the bus 510. Communicative coupling between a processor 520 and a memory 530 may enable the processor 520 to read and/or process information stored in the memory 530 and/or to store information in the memory 530.

The input component 540 may enable the device 500 to receive input, such as user input and/or sensed input. For example, the input component 540 may include a touch screen, a keyboard, a keypad, a mouse, a button, a microphone, a switch, a sensor, a global positioning system sensor, an accelerometer, a gyroscope, and/or an actuator. The output component 550 may enable the device 500 to provide output, such as via a display, a speaker, and/or a light-emitting diode. The communication component 560 may enable the device 500 to communicate with other devices via a wired connection and/or a wireless connection. For example, the communication component 560 may include a receiver, a transmitter, a transceiver, a modem, a network interface card, and/or an antenna.

The device 500 may perform one or more operations or processes described herein. For example, a non-transitory computer-readable medium (e.g., memory 530) may store a set of instructions (e.g., one or more instructions or code) for execution by the processor 520. The processor 520 may execute the set of instructions to perform one or more operations or processes described herein. In some implementations, execution of the set of instructions, by one or more processors 520, causes the one or more processors 520 and/or the device 500 to perform one or more operations or processes described herein. In some implementations, hardwired circuitry may be used instead of or in combination with the instructions to perform one or more operations or processes described herein. Additionally, or alternatively, the processor 520 may be configured to perform one or more operations or processes described herein. Thus, implementations described herein are not limited to any specific combination of hardware circuitry and software.

The number and arrangement of components shown in FIG. 5 are provided as an example. The device 500 may include additional components, fewer components, different components, or differently arranged components than those shown in FIG. 5. Additionally, or alternatively, a set of components (e.g., one or more components) of the device 500 may perform one or more functions described as being performed by another set of components of the device 500.

Figure 6:
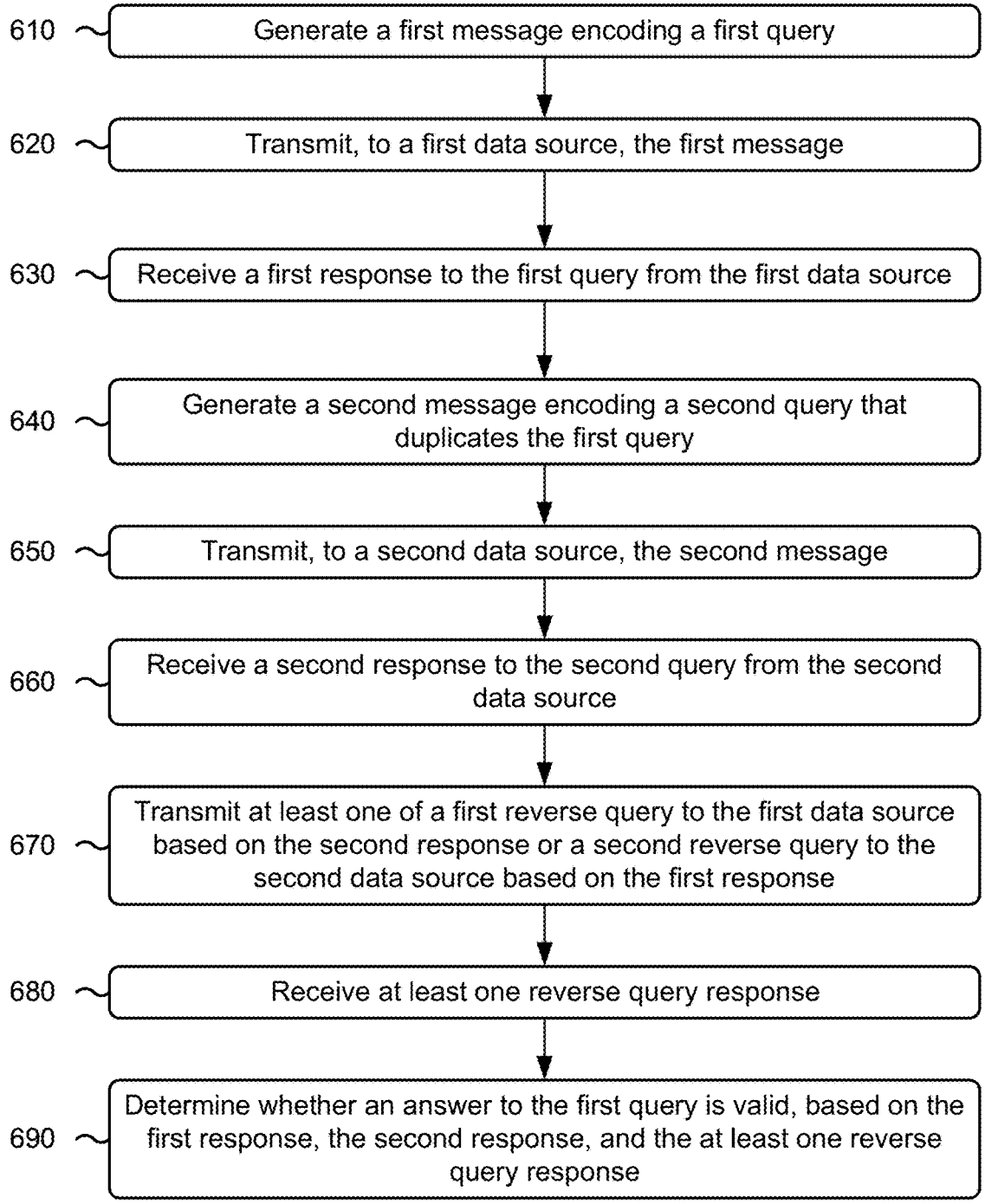
FIG. 6 is a flowchart of an example process relating to data authentication and validation across multiple sources, interfaces, and networks.

FIG. 6 is a flowchart of an example process 600 associated with data authentication and validation across multiple sources, interfaces, and networks. In some implementations, one or more process blocks of FIG. 6 are performed by a user device (e.g., user device 410). In some implementations, one or more process blocks of FIG. 6 are performed by another device or a group of devices separate from or including the user device, such as a first data source (e.g., first data source 420), a second data source (e.g., second data source 430), a third data source (e.g., third data source 440), and/or a remote server (e.g., remote server 460). Additionally, or alternatively, one or more process blocks of FIG. 6 may be performed by one or more components of device 500, such as processor 520, memory 530, input component 540, output component 550, and/or communication component 560.

As shown in FIG. 6, process 600 may include generating a first message encoding a first query (block 610). For example, the user device (e.g., using processor 520 and/or memory 530) may generate a first message encoding a first query, as described herein.

As further shown in FIG. 6, process 600 may include transmitting, to a first data source, the first message (block 620). For example, the user device (e.g., using processor 520, memory 530, and/or communication component 560) may transmit, to a first data source, the first message, as described herein.

As further shown in FIG. 6, process 600 may include receiving a first response to the first query from the first data source (block 630). For example, the user device (e.g., using processor 520, memory 530, and/or communication component 560) may receive a first response to the first query from the first data source, as described herein.

As further shown in FIG. 6, process 600 may include generating a second message encoding a second query that duplicates the first query (block 640). For example, the user device may (e.g., using processor 520 and/or memory 530) generate a second message encoding a second query that duplicates the first query, as described herein.

As further shown in FIG. 6, process 600 may include transmitting, to a second data source, the second message (block 650). For example, the user device (e.g., using processor 520, memory 530, and/or communication component 560) may transmit, to a second data source, the second message, as described herein.

As further shown in FIG. 6, process 600 may include receiving a second response to the second query from the second data source (block 660). For example, the user device (e.g., using processor 520, memory 530, and/or communication component 560) may receive a second response to the second query from the second data source, as described herein.

As further shown in FIG. 6, process 600 may include transmitting at least one of a first reverse query to the first data source based on the second response or a second reverse query to the second data source based on the first response (block 670). For example, the user device (e.g., using processor 520, memory 530, and/or communication component 560) may transmit at least one of a first reverse query to the first data source based on the second response or a second reverse query to the second data source based on the first response, as described herein.

As further shown in FIG. 6, process 600 may include receiving at least one reverse query response (block 680). For example, the user device (e.g., using processor 520, memory 530, and/or communication component 560) may receive at least one reverse query response, as described herein.

As further shown in FIG. 6, process 600 may include determining whether an answer to the first query is valid, based on the first response, the second response, and the at least one reverse query response (block 690). For example, the user device (e.g., using processor 520 and/or memory 530) may determine whether an answer to the first query is valid, based on the first response, the second response, and the at least one reverse query response, as described herein.

Process 600 may include additional implementations, such as any single implementation or any combination of implementations described below and/or in connection with one or more other processes described elsewhere herein.

In a first implementation, process 600 includes generating (e.g., using processor 520 and/or memory 530) a third message encoding a third query that duplicates the first query; transmitting (e.g., using processor 520, memory 530, and/or communication component 560), to a third data source, the third message; and receiving (e.g., using processor 520, memory 530, and/or communication component 560) a third response to the third query from the third data source, such that determining whether the answer to the first query is valid is further based on the third response.

In a second implementation, alone or in combination with the first implementation, process 600 includes at least one of transmitting (e.g., using processor 520, memory 530, and/or communication component 560) a third reverse query to the first data source based on the third response, transmitting (e.g., using processor 520, memory 530, and/or communication component 560) a fourth reverse query to the second data source based on the third response, transmitting (e.g., using processor 520, memory 530, and/or communication component 560) a fifth reverse query to the third data source based on the first response, or transmitting (e.g., using processor 520, memory 530, and/or communication component 560) a sixth reverse query to the third data source based on the second response, such that determining whether the answer to the first query is valid is further based on at least one reverse query response to the third reverse query, the fourth reverse query, the fifth reverse query, or the sixth reverse query.

In a third implementation, alone or in combination with one or more of the first and second implementations, determining whether the answer to the first query is valid includes determining whether the answer is valid based on a majority vote of the first response, the second response, and the third response.

In a fourth implementation, alone or in combination with one or more of the first through third implementations, process 600 includes generating (e.g., using processor 520, memory 530, and/or output component 550) an error message when the answer to the first query is invalid.

In a fifth implementation, alone or in combination with one or more of the first through fourth implementations, determining whether the answer to the first query is valid includes discarding the first response or the second response based on the at least one reverse query response.

In a sixth implementation, alone or in combination with one or more of the first through fifth implementations, determining whether the response is valid based on whether a quantity of responses is larger than a quantity of messages.

In a seventh implementation, alone or in combination with one or more of the first through sixth implementations, generating the first message encoding the first query includes generating the first message using a first application layer protocol, and generating the second message encoding the second query includes generating the second message using a second application layer protocol.

In an eighth implementation, alone or in combination with one or more of the first through seventh implementations, transmitting the first message includes transmitting the first message using a first transport library on a first network, and transmitting the second message includes transmitting the second message using a second transport library on a second network.

In a ninth implementation, alone or in combination with one or more of the first through eighth implementations, transmitting the first message includes transmitting the first message using a first transport library on a network, and transmitting the second message includes transmitting the second message using a second transport library on a virtual network.

In a tenth implementation, alone or in combination with one or more of the first through ninth implementations, transmitting the first message includes transmitting the first message over a first interface, and transmitting the second message includes transmitting the second message over a second interface.

In an eleventh implementation, alone or in combination with one or more of the first through tenth implementations, transmitting the first message includes transmitting the first message over an interface, and transmitting the second message includes transmitting the second message over a virtual interface.

Although FIG. 6 shows example blocks of process 600, in some implementations, process 600 includes additional blocks, fewer blocks, different blocks, or differently arranged blocks than those depicted in FIG. 6. Additionally, or alternatively, two or more of the blocks of process 600 may be performed in parallel.

The foregoing disclosure provides illustration and description, but is not intended to be exhaustive or to limit the implementations to the precise forms disclosed. Modifications may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method, comprising:
    generating, at a user device, a first message encoding a first query using a first application layer protocol;
    electrically transmitting, to a first data source, the first message via a network interface over a network, wherein the network interface is electrically coupled to a bus in the user device;
    electrically receiving, via the network interface at the user device, a first response to the first query from the first data source, wherein the first response to the first query from the first data source comprises an answer to the first query;
    generating, at the user device, a second message encoding a second query using a second application layer protocol different from the first application layer protocol, wherein the second query duplicates the first query;
    electrically transmitting, to a second data source, the second message via the network interface over the network;
    electrically receiving, via the network interface at the user device, a second response to the second query from the second data source;
    electrically transmitting via the network interface, at least one of a first reverse query to the first data source based on the second response or a second reverse query to the second data source based on the first response;
    electrically receiving via the network interface at the user device, at least one reverse query response in response to the transmitted at least one of the first reverse query or the second reverse query;
    determining, at the user device, whether the answer to the first query is valid or invalid, based on: the first response, the second response, and the at least one reverse query response, wherein the answer is determined to be valid or invalid based on an integrity validation test applied to the answer; and
    in response to a determination that the answer to the first query is invalid:
        generating, at a display of the user device, an error message indicating to a user of the user device that the answer is invalid, and
        receiving an input from the user regarding whether to proceed to access a resource associated with the answer determined to be invalid in response to the error message.

2. The method of claim 1, further comprising:
    in response to a determination that the answer to the first query is valid:
        generating, at the user device, a third message encoding a third query using a third application layer protocol different from the first application layer protocol and the second application layer protocol, wherein the third query duplicates the first query;
        electrically transmitting, via the network interface, to a third data source, the third message;
        electrically receiving, via the network interface at the user device, a third response to the third query from the third data source; and
        determining, at the user device, whether the answer to the first query is still valid further based on the third response.

3. The method of claim 2, further comprising:
    in response to a determination that the answer to the first query is still valid, performing at least one of:
        electrically transmitting, via the network interface, a third reverse query to the first data source based on the third response;
        electrically transmitting, via the network interface, a fourth reverse query to the second data source based on the third response;
        electrically transmitting, via the network interface, a fifth reverse query to the third data source based on the first response; or
        electrically transmitting, via the network interface, a sixth reverse query to the third data source based on the second response; and
        determining whether the answer to the first query is still valid further based on at least one reverse query response to the third reverse query, the fourth reverse query, the fifth reverse query, or the sixth reverse query.

4. The method of claim 2, wherein determining whether the answer to the first query is still valid comprises:
    determining whether the answer is still valid based on a majority vote of the first response, the second response, and the third response.

5. The method of claim 1, wherein determining whether the answer to the first query is valid or invalid comprises:
    discarding the first response or the second response based on the at least one reverse query response.

6. The method of claim 1, wherein determining whether the answer to the first query is valid or invalid comprises:
    determining whether a quantity of query responses electrically received at the user device is larger than a quantity of electrically transmitted messages.

7. The method of claim 1, wherein electrically transmitting the first message comprises electrically transmitting the first message using a first transport library on a first network, and electrically transmitting the second message comprises electrically transmitting the second message using a second transport library on a second network, wherein the second transport library is different from the first transport library, and wherein the first network and the second network are different from the network.

8. The method of claim 1, wherein electrically transmitting the first message comprises electrically transmitting the first message using a first transport library on the network, and electrically transmitting the second message comprises electrically transmitting the second message using a second transport library on a virtual network.

9. The method of claim 1, wherein electrically transmitting the first message comprises electrically transmitting the first message over a first network interface, and electrically transmitting the second message comprises electrically transmitting the second message over a second network interface different from the first network interface, wherein the first network interface and the second network interface are different from the network interface.

10. The method of claim 1, wherein electrically transmitting the first message comprises electrically transmitting the first message over the network interface, and electrically transmitting the second message comprises electrically transmitting the second message over a virtual network interface.

11. A device comprising:
one or more memories; and
one or more processors, communicatively coupled to the one or more memories, configured to:
generate a first message encoding a first query using a first application layer protocol;
electrically transmit, to a first data source, the first message via a network interface over a network, wherein the network interface is electrically coupled to a bus in the user device;
electrically receive, via the network interface, a first response to the first query from the first data source, wherein the first response to the first query from the first data source comprises an answer to the first query;
generate a second message encoding a second query using a second application layer protocol different from the first application layer protocol, wherein the second query duplicates the first query,
electrically transmit, to a second data source, the second message via the network interface over the network;
electrically receive, via the network interface, a second response to the second query from the second data source;
electrically transmit, via the network interface, at least one of a first reverse query to the first data source based on the second response or a second reverse query to the second data source based on the first response;
electrically receive, via the network interface, at least one reverse query response in response to the transmitted at least one of the first reverse query or the second reverse query;
determine whether the answer to the first query is valid or invalid, based on: the first response, the second response, and the at least one reverse query response, wherein the answer is determined to be valid or invalid based on an integrity validation test applied to the answer; and;
in response to a determination that the answer to the first query is invalid:
generate, at a display of the user device, an error message indicating to a user of the user device that the answer is invalid, and
receive an input from the user regarding whether to proceed to access a resource associated with the answer determined to be invalid in response to the error message.

12. The device of claim 11, wherein the one or more processors are further configured to:
in response to a determination that the answer to the first query is valid:
generate a third message encoding a third query using a third application layer protocol different from the first application layer protocol and the second application layer protocol, wherein the third query duplicates the first query;
electrically transmit, via the network interface, to a third data source, the third message;
electrically receive, via the network interface, a third response to the third query from the third data source; and
determine whether the answer to the first query is still valid further based on the third response.

13. The device of claim 12, wherein the one or more processors are further configured to:
in response to a determination that the answer to the first query is still valid, performing at least one of:
electrically transmit a third reverse query to the first data source based on the third response;
electrically transmit a fourth reverse query to the second data source based on the third response;
electrically transmit a fifth reverse query to the third data source based on the first response; or
electrically transmit a sixth reverse query to the third data source based on the second response; and
determine whether the answer to the first query is still valid further based on at least one reverse query response to the third reverse query, the fourth reverse query, the fifth reverse query, or the sixth reverse query.

14. The device of claim 11, wherein electrically transmitting the first message comprises electrically transmitting the first message using a first transport library on a first network, and electrically transmitting the second message comprises electrically transmitting the second message using a second transport library on a second network, wherein the second transport library is different from the first transport library, and wherein the first network and the second network are different from the network.

15. The device of claim 11, wherein electrically transmitting the first message comprises electrically transmitting the first message using a first transport library on the network, and electrically transmitting the second message comprises electrically transmitting the second message using a second transport library on a virtual network.

16. The device of claim 11, wherein electrically transmitting the first message comprises electrically transmitting the first message over a first interface, and electrically transmitting the second message comprises electrically transmitting the second message over a second interface different from the first network interface, wherein the first network interface and the second network interface are different from the network interface.

17. A non-transitory computer-readable medium storing a set of instructions, the set of instructions comprising:
one or more instructions that, when executed by one or more processors of a device, cause the device to:
generate, at the device, a first message encoding a first query using a first application layer protocol;
electrically transmit, to a first data source, the first message via a network interface over a network, wherein the network interface is electrically coupled to a bus in the user device;
electrically receive, via a network interface at the device, a first response to the first query from the first data source, wherein the first response to the first query from the first data source comprises an answer to the first query;
generate, at the device, a second message encoding a second query using a second application layer protocol different from the first application layer protocol, wherein the second query duplicates the first query;

electrically transmit, to a second data source, the second message via the network interface over the network;

electrically receive, via a network interface at the device, a second response to the second query from the second data source;

electrically transmit via a network interface, at least one of a first reverse query to the first data source based on the second response or a second reverse query to the second data source based on the first response;

electrically receive, via a network interface, at least one reverse query response in response to the transmitted at least one of the first reverse query or the second reverse query;

determine whether the answer to the first query is valid or invalid, based on; the first response, the second response, and the at least one reverse query response, wherein the answer is determined to be valid or invalid based on an integrity validation test applied to the answer; and in response to a determination that the answer to the first query is invalid:
- generate, at a display of the user device, an error message indicating to a user of the user device that the answer is invalid, and
- receive an input from the user regarding whether to proceed to access a resource associated with the answer determined to be invalid in response to the error message.

* * * * *